United States Patent
Suzuki et al.

(10) Patent No.: US 7,730,905 B2
(45) Date of Patent: Jun. 8, 2010

(54) HIGH PRESSURE VALVE FOR HYDROGEN GAS AND DECOMPRESSION DEVICE FOR HYDROGEN GAS

(75) Inventors: Hiroaki Suzuki, Nagoya (JP); Yoshiyuki Takeuchi, Gamagori (JP); Toshihiko Shima, Okazaki (JP); Soichi Shirai, Toyohashi (JP)

(73) Assignees: Toyooki Kogyo Co., Ltd., Okazaki-shi (JP); Jtekt Corporation, Osaka-shi (JP)

( * ) Notice: Subject to any disclaimer, the term of this patent is extended or adjusted under 35 U.S.C. 154(b) by 0 days.

(21) Appl. No.: 12/018,536

(22) Filed: Jan. 23, 2008

(65) Prior Publication Data

US 2008/0121288 A1    May 29, 2008

Related U.S. Application Data

(62) Division of application No. 10/878,613, filed on Jun. 29, 2004, now abandoned.

(30) Foreign Application Priority Data

Jun. 30, 2003    (JP) ............................... 2003-188589

(51) Int. Cl.
*G05D 16/06* (2006.01)
(52) U.S. Cl. .................................... 137/613; 251/30.03
(58) Field of Classification Search ................. 137/613; 251/30.03, 30.04, 129.19
See application file for complete search history.

(56) References Cited

U.S. PATENT DOCUMENTS

| | | | |
|---|---|---|---|
| 2,575,272 A * | 11/1951 | Harris ..................... | 251/30.04 |
| 2,716,421 A | 8/1955 | Bertrand | |
| 2,794,615 A | 6/1957 | Tolleson | |
| 2,868,497 A | 1/1959 | Graham | |
| 3,010,695 A | 11/1961 | Banks | |
| 3,108,779 A | 10/1963 | Anderson | |
| 3,111,141 A | 11/1963 | Hughes et al. | |
| 3,405,906 A * | 10/1968 | Keller ..................... | 251/30.04 |
| 3,575,381 A | 4/1971 | Gilmore | |
| 3,632,081 A * | 1/1972 | Evans ..................... | 251/129.19 |
| 3,812,877 A | 5/1974 | Fleischhacker et al. | |
| 4,257,450 A | 3/1981 | Ollivier | |
| 4,269,391 A | 5/1981 | Saito et al. | |
| 4,304,264 A * | 12/1981 | McClintock et al. ..... | 251/30.04 |
| 4,719,940 A | 1/1988 | Beavers | |
| 4,732,364 A | 3/1988 | Seger et al. | |
| 4,938,450 A * | 7/1990 | Tripp et al. .............. | 251/30.03 |
| 5,002,253 A * | 3/1991 | Kolchinsky et al. .... | 251/129.15 |

(Continued)

FOREIGN PATENT DOCUMENTS

FR    2 669 938    6/1992

(Continued)

*Primary Examiner*—John Rivell
*Assistant Examiner*—Craig Price
(74) *Attorney, Agent, or Firm*—Oblon, Spivak, McClelland, Maier & Neustadt, L.L.P.

(57) ABSTRACT

A high pressure valve for hydrogen gas includes a valve seat and a valve member, which is movable to selectively open and close the valve seat. One of the valve member and the valve seat is formed of austenitic stainless steel, and the other one of the valve member and the valve seat is formed of flexible synthetic resin or soft metal.

4 Claims, 7 Drawing Sheets

U.S. PATENT DOCUMENTS

| | | | |
|---|---|---|---|
| 5,048,790 A * | 9/1991 | Wells | 251/30.04 |
| 5,144,973 A | 9/1992 | Green et al. | |
| 5,188,017 A | 2/1993 | Grant et al. | |
| 5,413,096 A | 5/1995 | Hart | |
| 5,452,738 A | 9/1995 | Borland et al. | |
| 5,474,104 A | 12/1995 | Borland et al. | |
| 5,562,117 A | 10/1996 | Borland et al. | |
| 5,633,094 A | 5/1997 | Takeshima et al. | |
| 5,762,086 A * | 6/1998 | Ollivier | 137/613 |
| 5,810,330 A * | 9/1998 | Eith et al. | 251/129.19 |
| 5,829,735 A | 11/1998 | Ikeda | |
| 5,890,512 A | 4/1999 | Gotthelf et al. | |
| 5,899,194 A * | 5/1999 | Iwatsuki et al. | 251/129.21 |
| 6,209,970 B1 * | 4/2001 | Kamiya et al. | 137/627.5 |
| 6,302,136 B1 | 10/2001 | Weaver et al. | |
| 6,520,206 B2 * | 2/2003 | Hotta et al. | 137/613 |
| 6,557,821 B2 * | 5/2003 | Girouard et al. | 251/30.03 |
| 6,675,831 B2 * | 1/2004 | Sakaguchi et al. | 137/613 |
| 6,691,729 B2 * | 2/2004 | Takeda et al. | 137/613 |
| 6,755,390 B2 * | 6/2004 | Masuda et al. | 251/30.03 |
| 6,910,602 B2 | 6/2005 | Hasaka et al. | |

FOREIGN PATENT DOCUMENTS

| | | |
|---|---|---|
| JP | 52-121827 U | 9/1977 |
| JP | 62-001479 A | 1/1987 |
| JP | 63-105287 A | 5/1988 |
| JP | 7-301359 A | 11/1995 |
| JP | 8-75029 | 3/1996 |
| JP | 11-002356 | 1/1999 |
| JP | 11-118046 | 4/1999 |
| JP | 2003-049997 | 2/2003 |
| JP | 2003-166700 A | 6/2003 |

* cited by examiner

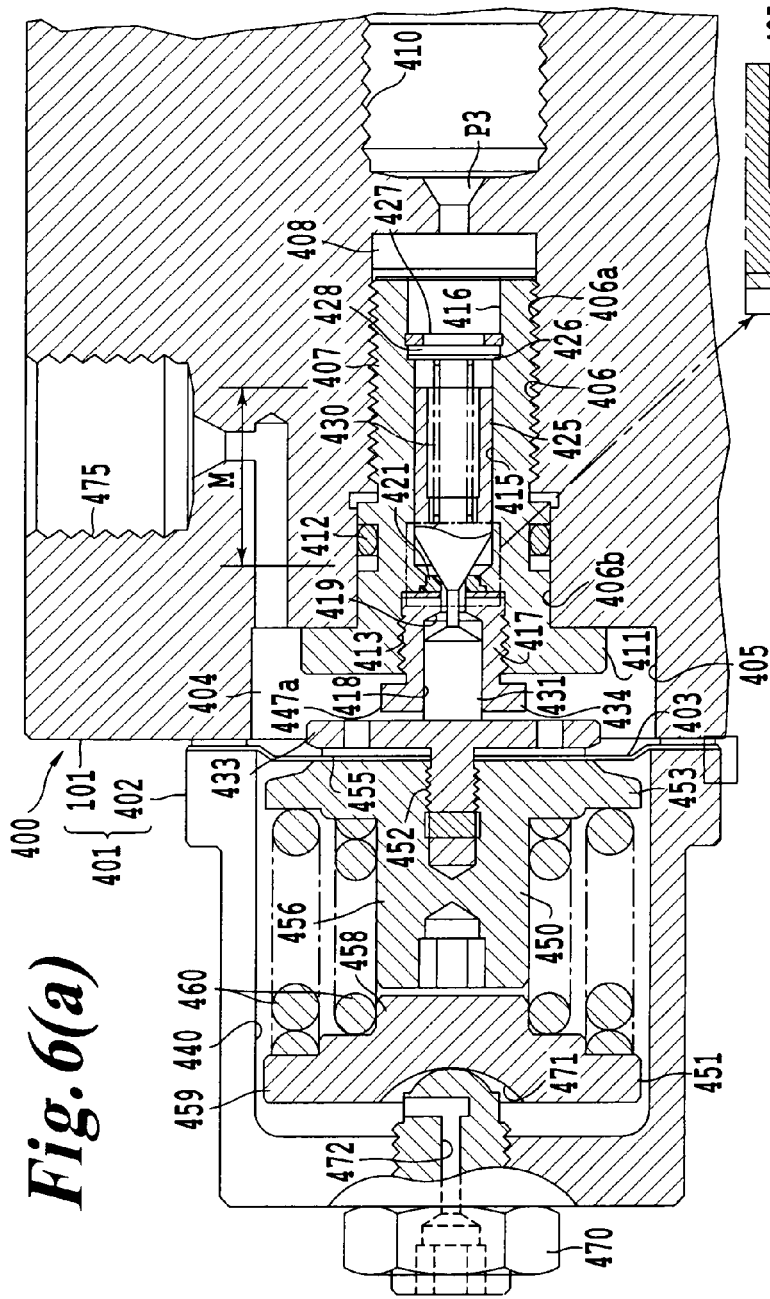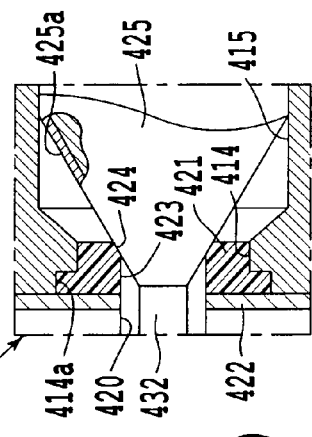
*Fig. 6(a)*
*Fig. 6(b)*

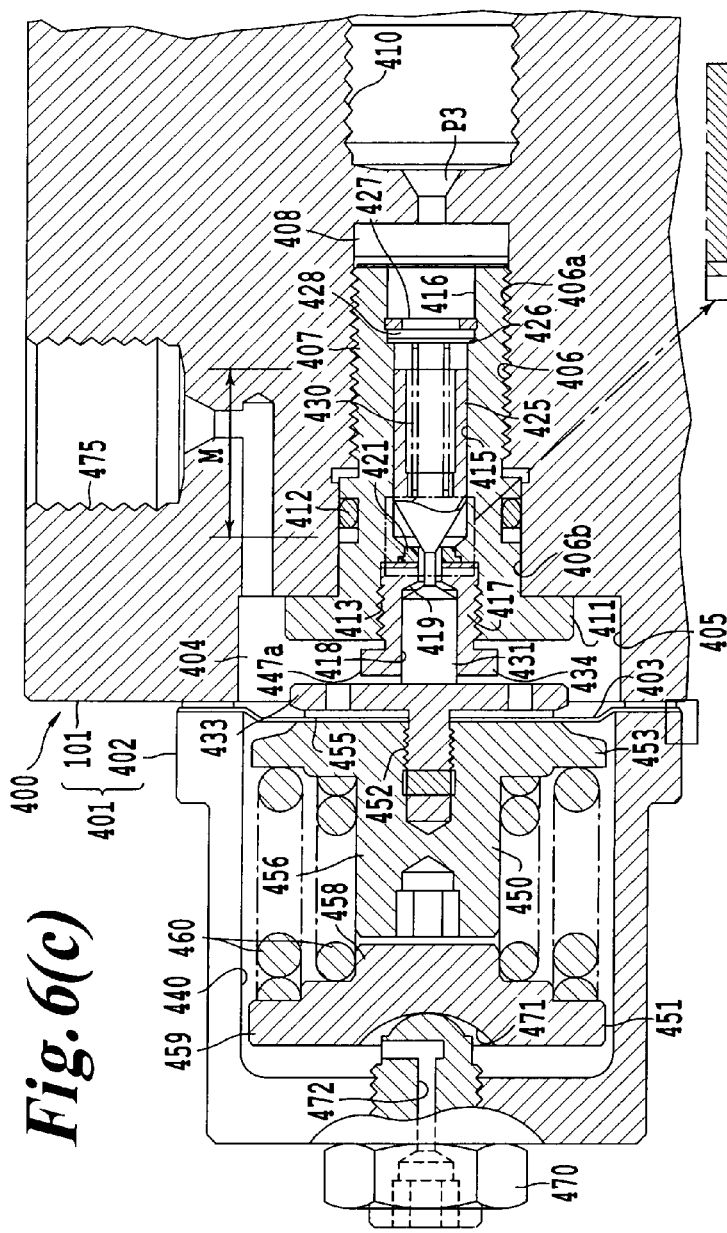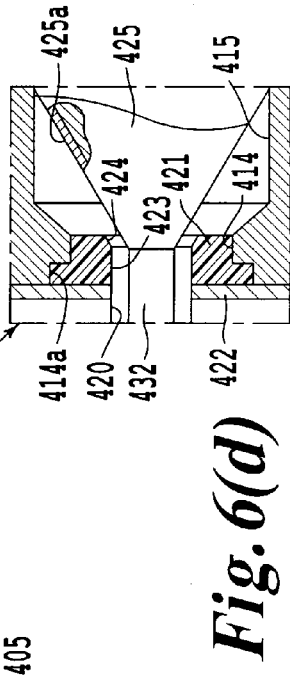
*Fig. 6(c)*
*Fig. 6(d)*

HIGH PRESSURE VALVE FOR HYDROGEN GAS AND DECOMPRESSION DEVICE FOR HYDROGEN GAS

The present application is a divisional application of U.S. patent application Ser. No. 10/878,613 filed on Jun. 29, 2004, and is based on Japanese patent application No. 2003-188589 filed Jun. 30, 2003, which is hereby incorporated herein by reference.

BACKGROUND OF THE INVENTION

The present invention relates to a high pressure valve for hydrogen gas and a decompression device for hydrogen gas. More particularly, the present invention pertains to a high pressure valve for hydrogen gas and a decompression device for hydrogen gas that are suitable for use in a high-pressure hydrogen gas tank for automobiles driven by a fuel cell.

In the prior art, a high-pressure hydrogen gas tank for an automobile driven by a fuel cell is filled with hydrogen gas at a pressure of 35 MPa. As for a high pressure valve for hydrogen gas attached to the high-pressure hydrogen gas tank, for example, an electromagnetic valve or a pressure reducing valve is used. The pressure reducing valve reduces the pressure of high-pressure hydrogen gas discharged from the electromagnetic valve to a particular pressure (e.g. 1 MPa). As for the electromagnetic valve, a semi-pilot type valve is known in the art. The semi-pilot type valve is switched between an open state and a closed state in accordance with the excitation or de-excitation of a solenoid. In the open state, a pilot valve is separated from a pilot valve seat. In the closed state, the pilot valve contacts the pilot valve seat. When the pilot valve opens, a main valve body separates from a main valve seat to open the valve.

The pressure reducing valve typically includes a valve hole connected to a pressure reducing chamber, which is defined between a body and a diaphragm. Such a pressure reducing valve includes a valve body, which selectively contacts a valve seat located around the valve hole. A valve shaft is connected to the center of the diaphragm. The valve body and the valve shaft are coaxially secured to each other.

Material for the pilot valve and the pilot valve seat in the electromagnetic valve and material for the valve body and the valve seat in the pressure reducing valve are selected as required without any design limitation. In this case also, the pilot valve, the pilot valve seat, the valve body, and the valve seat can withstand a high pressure of 35 MPa and maintains the sealing effectiveness even when the valves are closed.

However, the high-pressure hydrogen gas tank for an automobile driven by a fuel cell in these days is aimed to be filled with hydrogen gas at a higher pressure such as a pressure of 70 MPa. Therefore, if the prior art electromagnetic valve and the pressure reducing valve are actually used in the tank for hydrogen gas having higher pressure, sufficient sealing effectiveness cannot be maintained.

SUMMARY OF THE INVENTION

Accordingly, it is an objective of the present invention to provide a high pressure valve for hydrogen gas and a decompression device for hydrogen gas that provide sufficient sealing effectiveness even if the pressure of the hydrogen gas is increased.

To achieve the foregoing and other objectives and in accordance with the purpose of the present invention, a high pressure valve for hydrogen gas is provided. The high pressure valve includes a valve seat and a valve member. The valve member is movable to selectively open and close the valve seat. One of the valve member and the valve seat is formed of austenitic stainless steel, and the other one of the valve member and the valve seat is formed of flexible synthetic resin or soft metal.

The present invention also provides a pressure reducing valve used to reduce the pressure in a tank containing hydrogen gas. The pressure reducing valve includes a valve body, a diaphragm, and a valve member. The valve body and the diaphragm define a pressure reducing chamber that includes a valve hole provided with a valve seat. The valve member is located to selectively contact the valve seat. The valve member is connected to the diaphragm, and the diaphragm is displaced in accordance with the pressure in the pressure reducing chamber. The valve member selectively opens and closes the valve hole in accordance with the displacement of the diaphragm.

In another aspect of the present invention, the present invention provides a decompression device for connection to a high pressure hydrogen tank. The decompression device includes an electromagnetic valve connectable to the high pressure hydrogen tank and a pressure reducing valve connected to the electromagnetic valve for emitting decompressed hydrogen gas to the exterior via the electromagnetic valve and the pressure reducing valve. The electromagnetic valve includes a solenoid, a main valve seat, a pilot valve seat, a main valve body, and a pilot valve body. The main valve body is switchable between a closed state, where the main valve body contacts the main valve seat, and an open state, where the main valve body is separated from the main valve seat. The pilot valve body is switchable between a closed state, where the pilot valve body contacts the pilot valve seat, and an open state, where the pilot valve body is separated from the pilot valve seat. The pilot valve body is switched between the open state and the closed state in accordance with excitation and de-excitation of the solenoid. The main valve body switches from the closed state to the open state when the pilot valve body is switched from the closed state to the open state. The pressure reducing valve includes a valve body and a diaphragm. The valve body and the diaphragm define a pressure reducing chamber. The pressure reducing chamber includes a valve hole provided with a valve seat, and a valve member located to selectively contact the valve seat. The valve member is connected to the diaphragm. The diaphragm is displaced in accordance with the pressure in the pressure reducing chamber. The valve member selectively opens and closes the valve hole in accordance with the displacement of the diaphragm.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6(a) is an enlarged cross-sectional view illustrating the pressure reducing valve shown in FIG. 3, and showing the valve body in a closed state;

FIG. 6(b) is an enlarged partial cross-sectional view illustrating the pressure reducing valve shown in FIG. 6(a);

FIG. 6(c) is an enlarged cross-sectional view showing the valve body in an open state;

FIG. 6(d) is an enlarged partial cross-sectional view illustrating the pressure reducing valve shown in FIG. 6(c).

DETAILED DESCRIPTION OF THE PREFERRED EMBODIMENTS

A high pressure valve for hydrogen gas and a decompression device 10 for hydrogen gas (hereinafter, referred to as a decompression device) according to one embodiment of the present invention will now be described with reference to FIGS. 1 to 6. The high pressure valve for hydrogen gas is applied to an electromagnetic valve 100 and a pressure reducing valve 400. The decompression device includes the electromagnetic valve 100 and the pressure reducing valve 400.

Figure 1:
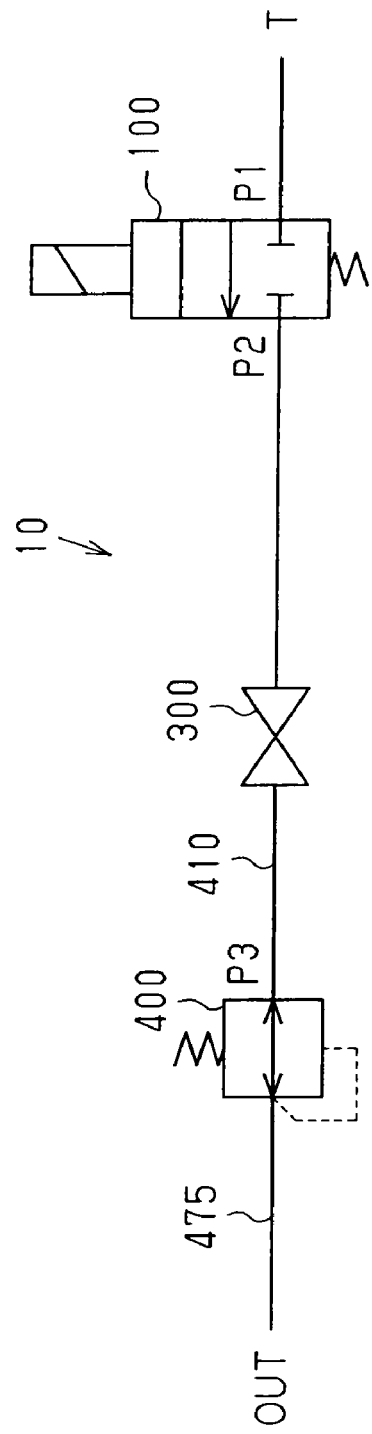
FIG. 1 is a schematic circuit diagram illustrating a decompression device according to a preferred embodiment.

The decompression device 10 shown in FIG. 1 is mounted to a high-pressure hydrogen gas container, which is a high-pressure hydrogen tank T in this embodiment. The tank T is filled with hydrogen gas at a high pressure (70 MPa in this embodiment). The decompression device 10 includes an electromagnetic valve 100, a stop valve 300, and a pressure reducing valve 400. A stop valve 300 is open when high-pressure hydrogen gas is used.

When the electromagnetic valve 100 is open, high-pressure hydrogen gas in the tank T flows to the pressure reducing valve 400 through the stop valve 300. The pressure reducing valve 400 reduces the pressure of high-pressure hydrogen gas to a pressure of less than or equal to 1 MPa and discharges the hydrogen gas.

(Electromagnetic Valve 100)

Figure 2:
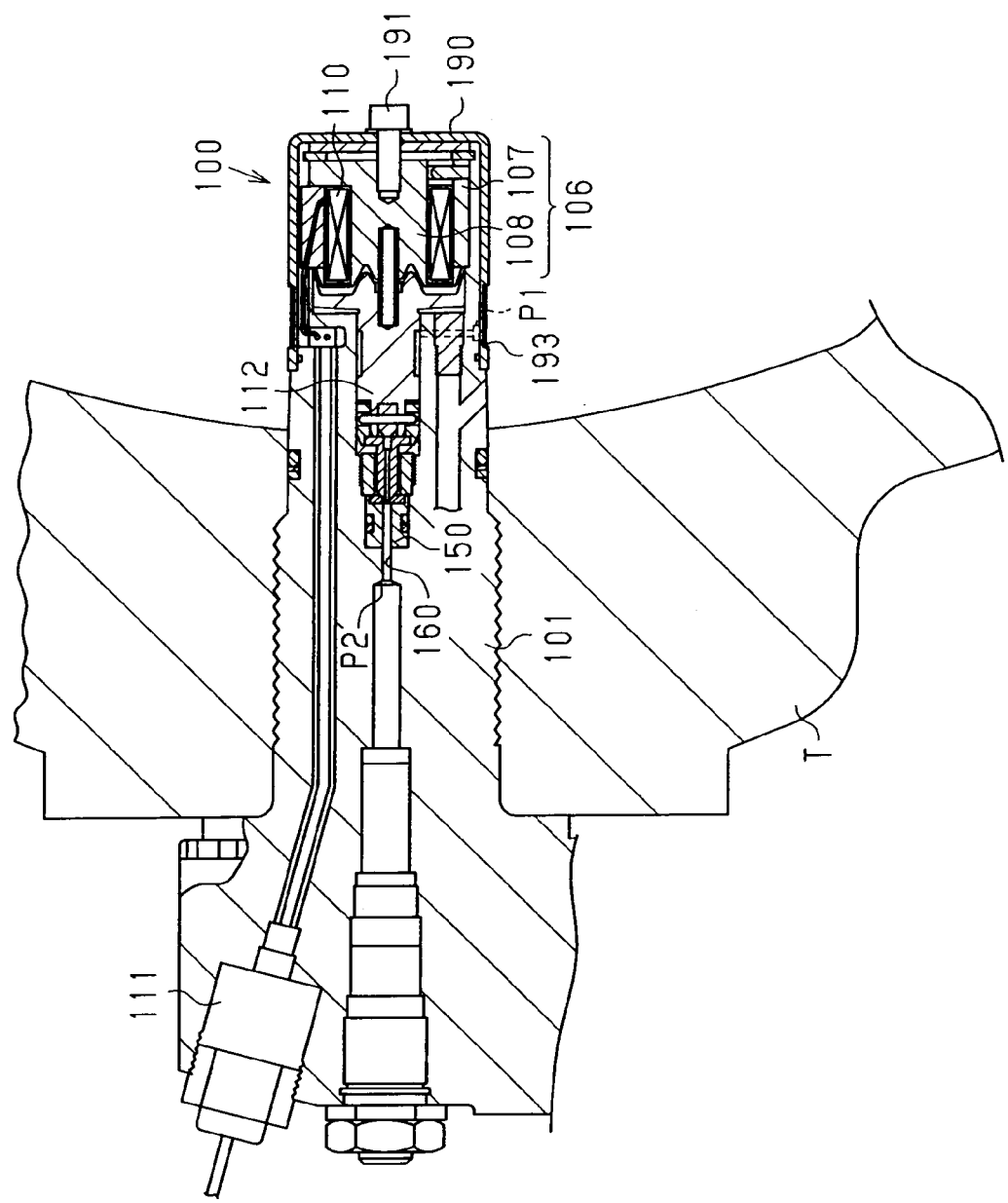
FIG. 2 is a cross-sectional view illustrating an electromagnetic valve.
Figure 4:
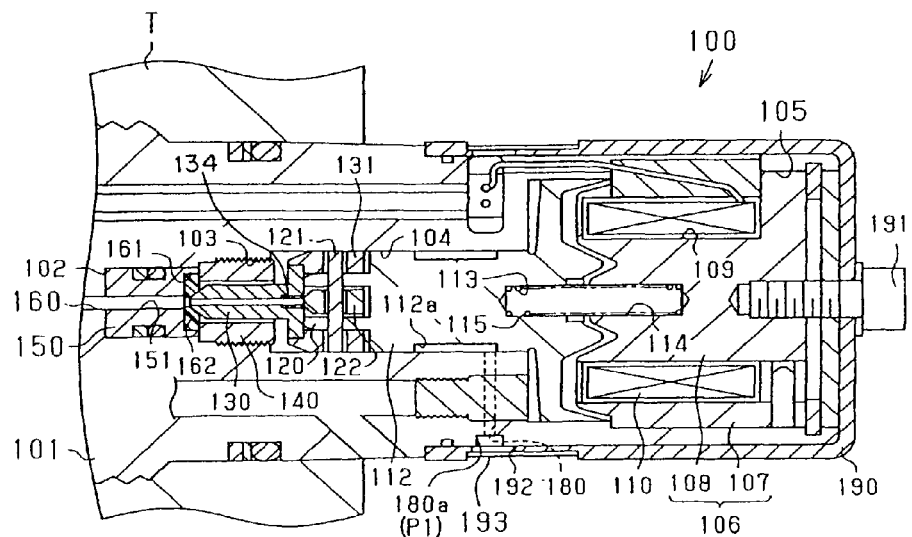
FIG. 4 is an enlarged cross-sectional view illustrating the electromagnetic valve shown in FIG. 2.

The electromagnetic valve 100 will now be described. As shown in FIGS. 2 and 4, the electromagnetic valve 100 is located on the end wall of the high-pressure hydrogen tank T. A mounting member 101 is attached to the end wall of the high-pressure hydrogen tank T and extends through the end wall. A main valve seat mounting bore 102, a guide member mounting bore 103, a plunger accommodating hole 104, and an electromagnetic portion accommodating bore 105 are coaxially formed at the inner end of the mounting member 101 along the axial direction in this order from the section close to the outside of the tank T toward the inside of the tank T. The inner diameters of the main valve seat mounting bore 102, the guide member mounting bore 103, the plunger accommodating hole 104, and the electromagnetic portion accommodating bore 105 increase in this order.

A coil accommodating member 106 is secured to the electromagnetic portion accommodating bore 105. The coil accommodating member 106 includes an outer cylinder portion 107 and a core 108, which extends in the outer cylinder portion 107 along the axial direction. The outer cylinder portion 107 and the core 108 are integrally formed with magnetic material. An annular accommodating groove 109, which is formed between the outer cylinder portion 107 and the core 108, accommodates an annular solenoid coil 110. As shown in FIG. 2, the solenoid coil 110 is electrically connected to a connector 111 located at the outer end of the mounting member 101. A control current is supplied to the solenoid coil 110 from a controller (not shown) through the connector 111 to excite the solenoid coil 110.

A plunger 112 is accommodated in the plunger accommodating hole 104 to freely slide along the axial direction. The proximal end of the plunger 112 located in the electromagnetic portion accommodating bore 105 has a larger diameter than the rest of the plunger 112. Spring accommodating bores 113, 114 are formed at the proximal end of the plunger 112 and the center of the core 108, respectively. The spring accommodating bores 113, 114 face each other. The ends of a coil spring 115 are accommodated in the spring accommodating bores 113, 114. The coil spring 115 urges the plunger 112 in a direction to close the valve (leftward as viewed in FIGS. 2 and 4). When the solenoid coil 110 is excited, the plunger 112 moves in a direction to open the valve (rightward as viewed in FIGS. 2 and 4) against the force of the coil spring 115.

Figure 5:
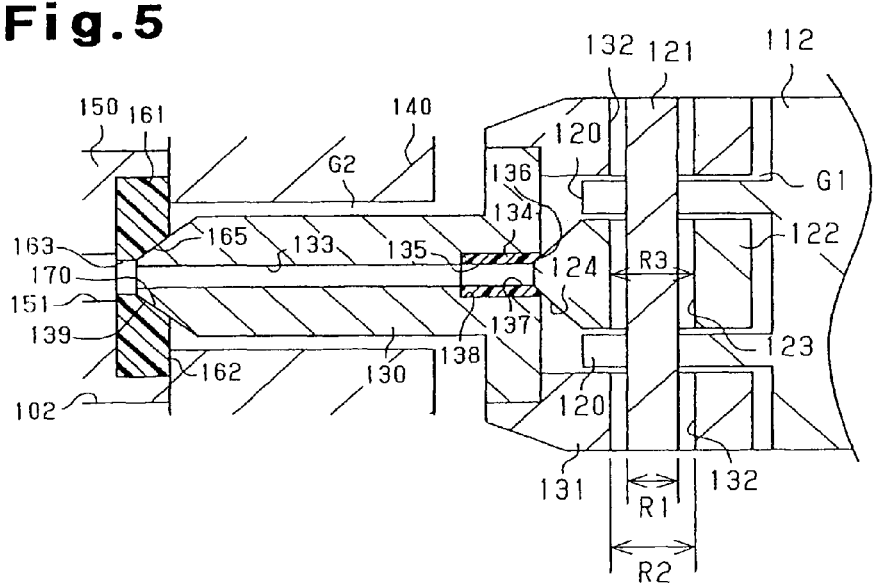
FIG. 5 is an enlarged cross-sectional view illustrating a main valve body and a pilot valve of the electromagnetic valve shown in FIG. 4.

As shown in FIG. 5, a pair of projections 120 are formed at the distal end of the plunger 112. The projections 120 are separate from each other. The projections 120 extend through and support a support pin 121 without play. A valve member, which is a pilot valve 122 in this embodiment, is loosely inserted through the support pin 121 between the projections 120. That is, a support hole 123 is formed in the pilot valve 122 and extends in a direction perpendicular to the axial direction of the pilot valve 122. The support pin 121 is inserted in the support hole 123. The diameter of the support pin 121 is smaller than the inner diameter of the support hole 123. In this manner, the pilot valve 122 is supported opposite to the plunger 112 with play along the operational direction of the plunger 112.

The distal end of the pilot valve 122 is formed to be a truncated circular cone and includes a tapered surface 124. In the preferred embodiment, the pilot valve 122 is formed of SUS316L stainless steel specified in Japanese Industrial Standard JIS G 4304 (Hot rolled stainless steel plates, sheets and strip)-4305 (Cold rolled stainless steel plates, sheets and strip). SUS316L is austenitic stainless steel containing 16-18% chromium (Cr), 12-15% nickel (Ni), 2-3% molybdenum (Mo), and carbon (C) less than or equal to 0.03%. SUS316L is stainless steel that has high resistance to hydrogen brittleness and has excellent corrosion resistance. The dimensional tolerance of the pilot valve 122 is less than or equal to 1 μm and the surface roughness is less than or equal to 1 μm Ra.

Both ends of the support pin 121 protruding from the projections 120 support a valve member, which is a main valve body 130 in this embodiment. The proximal end of the main valve body 130 is formed as a cylinder portion 131. A pair of support holes 132 are formed in the cylinder portion 131. The inner diameter of each support hole 132 is greater than the outer diameter of the support pin 121. The support holes 132 are formed opposite to each other. Therefore, the main valve body 130 is supported opposite to the plunger 112 with play along the operational direction of the plunger 112.

The inner diameter of the cylinder portion 131 is greater than the distance between the outer surfaces of the pair of projections 120. This forms a gap G1 in the cylinder portion 131 that serves as a flow passage for hydrogen gas. A notch (not shown) is formed in the outer circumference of the cylinder portion 131. A gap (not shown) is formed between the notch and the inner circumferential surface of the plunger accommodating hole 104 forming a flow passage for hydrogen gas.

The difference between the outer diameter R1 of the support pin 121 and the inner diameter R2 of the outer support hole 132, or the difference Δr1, and the difference between the outer diameter R1 of the support pin 121 and the inner diameter R3 of the inner support hole 123, or the difference Δr2, satisfy the following inequality.

Δr1>Δr2

According to this relationship, the support pin 121 contacts the pilot valve 122 before the main valve body 130 when the plunger 112 operates to open the valve. The diameters of the middle section and the distal end of the main valve body 130 are smaller than that of the proximal end and extend into the guide member mounting bore 103. A pilot bore 133 is formed through the main valve body 130 and extends in the axial direction between the inner bottom surface of the cylinder portion 131 and the distal end of the main valve body 130. The main valve body 130 is formed of SUS316L stainless steel. The distal end of the main valve body 130 is formed to be a truncated circular cone and includes a tapered surface 139. The dimensional tolerance of the main valve body 130 is less than or equal to 1 μm and the surface roughness is less than or equal to 1 μm Ra.

A step 138 is formed in the pilot bore 133 close to the inner bottom surface of the cylinder portion 131. The diameter of the step 138 is greater than the diameter of the pilot bore 133. A pilot valve seat 134 is located in the step 138. In the preferred embodiment, the pilot valve seat 134 is formed of a flexible polyimide resin. As for the polyimide resin, for example, a commercially available VESPEL (registered trademark of DuPont) may be used. The dimensional tolerance of the pilot valve seat 134 is less than or equal to 1 μm and the surface roughness is less than or equal to 1 μm Ra.

The pilot valve seat 134 has a bore 135, the diameter of which is the same as that of the pilot bore 133, and a pilot valve hole 137, which selectively contacts the tapered surface 124 of the pilot valve 122. The pilot valve hole 137 includes a tapered surface 136 the inner diameter of which increases toward the pilot valve 122.

A cylindrical guide member 140 is screwed to the inner circumference of the guide member mounting bore 103. The inner diameter of the guide member 140 is greater than the outer diameter of the main valve body 130. Thus, a gap G2 is formed between the guide member 140 and the main valve body 130, which forms a flow passage for hydrogen gas. A main valve seat support member 150 is inserted into and secured to the main valve seat mounting bore 102.

A through hole 151 extends through the main valve seat support member 150 in the axial direction. The through hole 151 is connected to a passage 160 formed along the axis of the mounting member 101. The downstream end of the passage 160 corresponds to a port P2 at the valve-outlet of the electromagnetic valve 100 (see FIG. 2). A step 161 is formed in the through hole 151 at the end of the main valve seat support member 150 that faces the guide member 140. The diameter of the step 161 is greater than that of the through hole 151. A main valve seat 162 is located in the step 161. In the preferred embodiment, the main valve seat 162 is formed of polyimide resin, which is flexible and is a synthetic resin that is softer than SUS316L stainless steel. The example of the polyimide resin includes the above mentioned VESPEL (registered trademark of DuPont). In the preferred embodiment, the dimensional tolerance of the main valve seat 162 is preferably less than or equal to 1 μm and the surface roughness is preferably less than or equal to 1 μm Ra.

A main valve hole 170 is formed in the main valve seat 162. The main valve hole 170 includes a bore 163 and a tapered surface 165. The diameter of the bore 163 is smaller than that of the through hole 151. The inner diameter of the main valve hole 170 at the tapered surface 165 increases toward the main valve body 130. The tapered surface 165 selectively contacts the tapered surface 139 of the main valve body 130.

As shown in FIG. 4, a passage 180 is formed between the inner circumferential surface of the plunger accommodating hole 104 of the mounting member 101 and the outer circumferential surface of the mounting member 101 extending in the radial direction. The passage 180 connects the plunger accommodating hole 104 and the inside of the high-pressure hydrogen tank T. The outer circumferential surface of the inner end of the mounting member 101 and the opening of the electromagnetic portion accommodating bore 105 are covered with a cylindrical cover 190. The cover 190 is fastened to the coil accommodating member 106 with a bolt 191. An opening 180a, which corresponds to the inlet of the passage 180, is formed on the outer circumferential surface of the mounting member 101. Holes 192 are formed in the circumferential surface of the cover 190 corresponding to the opening 180a, and a filter 193 is placed to cover the holes 192. The opening 180a corresponds to a port P1 at the valve-inlet of the electromagnetic valve 100 (see FIG. 2).

A groove 112a is formed in the circumferential surface of a portion of the plunger 112 that is accommodated in the plunger accommodating hole 104. The groove 112a extends along the axial direction such that the groove 112a always faces the inner end of the passage 180 corresponding to the outlet of the passage 180 during valve closing and valve opening operations. A notch (not shown) is formed in the plunger 112 at a section closer to the distal end than the groove 112a and extends in the axial direction. A gap (not shown) is formed between the notch and the inner circumferential surface of the plunger accommodating hole 104 forming a flow passage for hydrogen gas.

As a result, hydrogen gas in the high-pressure hydrogen tank T can flow through the filter 193, the holes 192, the passage 180, the groove 112a, the gap between the plunger 112 and the plunger accommodating hole 104, and the gap G1 (see FIG. 5). Furthermore, hydrogen gas in the high-pressure hydrogen tank T can flow through the gap between the plunger 112 and the plunger accommodating hole 104, the gap between the cylinder portion 131 and the plunger accommodating hole 104, and the gap G2 (see FIG. 5).

The operation of the electromagnetic valve 100 will now be described.

When the solenoid coil 110 is de-excited, the plunger 112 is pressed by the force of the coil spring 115 toward the valve closing direction. The force of the coil spring 115 is transmitted to the main valve body 130 via the support pin 121. Thus, the main valve body 130 is in a closed state where the main valve body 130 contacts the main valve seat 162. At this time, the pilot valve 122 is also in a closed state whenever the pilot valve 122 contacts the pilot valve seat 134. When a control current is supplied to the solenoid coil 110 from a controller (not shown) through the connector 111 in this state, the solenoid coil 110 is excited. As a result, the plunger 112 moves in a valve opening direction. At this time, when the support pin 121 moves by a distance corresponding to the difference Δr2 between the outer diameter R1 of the support pin 121 and the inner diameter R3 of the inner support hole 123, the support pin 121 contacts the pilot valve 122. The pilot valve 122 therefore moves with the support pin 121 and separates from the pilot valve seat 134.

When the pilot valve 122 opens, hydrogen gas flows to the pilot valve hole 137 through, for example, the gap G1, and then to the main valve hole 170 through the pilot valve hole 137 and the pilot bore 133. When the pilot valve 122 opens as described above, the difference between the pressure applied to the upstream section of the main valve body 130 and the pressure applied to the downstream section of the main valve body 130 decreases. In this state, when the plunger 112 moves by a distance corresponding to the difference Δr1 between the outer diameter R1 of the support pin 121 and the inner diameter R2 of the outer support hole 132 due to the subsequent operation of the plunger 112 in the valve opening direction, the support pin 121 contacts the main valve body 130. This moves the main valve body 130. That is, the main valve body 130 separates from the main valve seat 162. As a result, hydrogen gas flows to the main valve hole 170 through, for example, the gap G2.

Contrarily, when the solenoid coil 110 is de-excited, the plunger 112 is pressed by the force of the coil spring 115 toward the valve closing direction. The force of the coil spring 115 is transmitted to the pilot valve 122 and the main valve body 130 via the support pin 121. Thus, the pilot valve 122 is restored to the closed state where the pilot valve 122 contacts the pilot valve seat 134, and the main valve body 130 is restored to the closed state where the main valve body 130 contacts the main valve seat 162.

(Pressure Reducing Valve 400)

The pressure reducing valve 400 will now be described.

Figure 3:
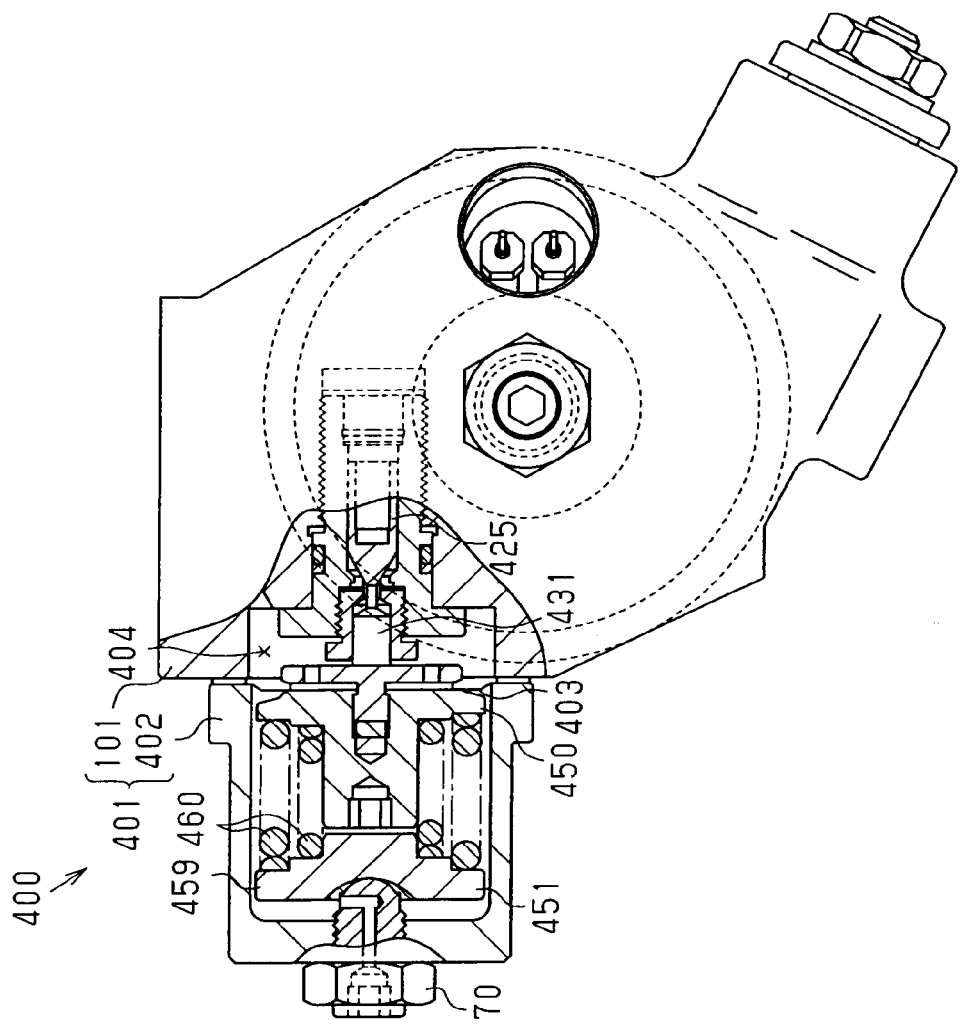
FIG. 3 is a partial cross-sectional view illustrating a pressure reducing valve.

As shown in FIGS. 3 and 6, the pressure reducing valve 400 is located at the outer end of the mounting member 101. A valve housing 401 of the pressure reducing valve 400 is formed with the distal end of the mounting member 101 and a cover 402, which is fastened to the side surface of the mounting member 101 with a bolt (not shown). The periphery of a metal diaphragm 403 is held between the cover 402 and the mounting member 101. A recess 405 having a circular cross-section is formed on one side of a valve body, which is the mounting member 101 in this embodiment, corresponding to the diaphragm 403. A pressure reducing chamber 404 is defined between the diaphragm 403 and the recess 405.

A mounting bore 406 having a bottom wall is formed in the mounting member 101. The mounting bore 406 is open to the pressure reducing chamber 404. The mounting bore 406 includes a female screw portion 406a formed in the innermost section of the mounting bore 406 and a fitting bore 406b located at the vicinity of the opening of the mounting bore 406. The diameter of the fitting bore 406b is greater than that of the female screw portion 406a. The bottom of the mounting bore 406 is connected to a passage 410 for hydrogen gas discharged from the stop valve 300.

A valve member accommodating member, which is a valve seat retaining member 407 in this embodiment, is screwed to the female screw portion 406a of the mounting bore 406. The valve seat retaining member 407 is formed in a cylindrical form with SUS316L stainless steel. A valve chamber 408 is defined between the valve seat retaining member 407 and the innermost section of the mounting bore 406. The valve chamber 408 is connected to the passage 410. A contact point between the passage 410 and the valve chamber 408 corresponds to a port P3 at the valve-inlet of the pressure reducing valve 400. A flange 411 is formed at the end of the valve seat retaining member 407 and is located in the pressure reducing chamber 404. The flange 411 is engaged with the peripheral portion of the fitting bore 406b. A sealing member 412 is fitted in a groove formed in the circumferential surface of the valve seat retaining member 407 corresponding to the fitting bore 406b. The sealing member 412 seals between the valve seat retaining member 407 and the inner circumferential surface of the fitting bore 406b.

A threaded bore 413, a valve seat mounting bore 414, a slide bore 415, and an opening 416 are formed along the central axis of the valve seat retaining member 407 in an order starting from the section close to the pressure reducing chamber 404 toward the valve chamber 408. A female screw is formed on the inner circumferential surface of the threaded bore 413. A cylindrical valve shaft guide member 417 is screwed to the threaded bore 413.

The valve shaft guide member 417 includes a guide hole 418 having a circular cross-section. The guide hole 418 extends in the axial direction. A communication hole 420, which is connected to the guide hole 418, is formed in a bottom wall 419 of the valve shaft guide member 417. The diameter of the communication hole 420 is smaller than that of the guide hole 418. A step 414a is formed in the valve seat mounting bore 414. Therefore, the valve seat mounting bore 414 includes a large diameter portion, which is closer to the valve shaft guide member 417 than the step 414a, and a small diameter portion, which is closer to the slide bore 415 than the step 414a. A valve seat 421 is fitted to the valve seat mounting bore 414 and is engaged with the step 414a.

When the valve shaft guide member 417 is screwed to the threaded bore 413, the valve shaft guide member 417 presses an annular member 422, which in turn presses the valve seat 421 to be engaged with the step 414a. The valve seat 421 includes a valve hole 423, which is connected to the communication hole 420 and a central hole of the annular member 422. The opening of the valve hole 423 facing the slide bore 415 widens toward the slide bore 415, thereby forming a tapered seat portion 424. The valve seat 421 is formed of polyimide resin, which is synthetic resin softer than SUS316L stainless steel. The example of the polyimide resin includes VESPEL (registered trademark of DuPont). In this case, the dimensional tolerance of the main valve seat 421 is preferably less than or equal to 1 μm and the surface roughness is preferably less than or equal to 1 μm Ra.

A valve body 425 is accommodated in the slide bore 415 such that the valve body 425 can freely slide in the slide bore 415. The valve body 425 serves as a valve member, which selectively contacts the seat portion 424. The outer diameter of the valve body 425 is smaller than the inner diameter of the slide bore 415. Therefore, a gap is formed between the inner circumferential surface of the slide bore 415 and the outer circumferential surface of the valve body 425 forming a passage for hydrogen gas (for the convenience of explanation, the gap is not shown in FIG. 6). The valve body 425 is formed in a cylindrical form with SUS316L stainless steel. The dimensional tolerance of the valve body 425 is less than or equal to 1 μm and the surface roughness is less than or equal to 1 μm Ra. A coating 425a having a low friction coefficient made of TiN is formed on the surface of the valve body 425 through physical vapor deposition (PVD) coating.

The characteristic constitution of the preferred embodiment will now be described. Sealing is not formed between the outer circumferential surface of the valve body 425 and the slide bore 415 of the valve seat retaining member 407 at a sealless portion M shown in FIG. 6. In other words, no sealing member is attached to either the valve body 425 or the valve seat retaining member 407 at the sealless portion M. The inner diameter of the opening 416 is slightly greater than that of the slide bore 415 and a locking step 426 is formed in the opening 416. A C-ring 427 is engaged with the opening 416. A filter member 428 is secured between the C-ring 427 and the locking step 426. A coil spring 430 is located between the filter member 428 and the valve body 425. The coil spring 430 urges the valve body 425 toward the seat portion 424. The distal end of the valve body 425 is tapered such that the distal end fits to the tapered seat portion 424.

A valve shaft 431 is accommodated in the guide hole 418 of the valve shaft guide member 417 to freely slide along the axial direction. The valve shaft 431 is integrally coupled with the distal end of the valve body 425 via a coupling shaft 432. The diameter of the coupling shaft 432 is smaller than the valve hole 423 and the communication hole 420. That is, the valve shaft 431 and the valve body 425 are integrated when the coupling shaft 432, which extends from the valve body 425, is screwed to the valve shaft 431.

The valve shaft 431 has a rectangular cross-section. Therefore, a gap is formed between the valve shaft 431 and the guide hole 418, which has a circular cross-section. A flange 433 is formed at the proximal end of the valve shaft 431. A flange 434 is also formed at the end of the valve shaft guide member 417 and is located in the pressure reducing chamber 404. The flanges 433, 434 contact each other when the valve body 425 is open. Grooves (not shown) are formed on the surface of the flange 434 to extend in the radial direction. The grooves permit hydrogen gas to flow into the pressure reducing chamber 404 even when the flanges 434, 433 contact each other.

A spring chamber 440 is formed between the cover 402 and the diaphragm 403. A pair of first and second spring support members 450, 451 are located in the spring chamber 440. The first spring support member 450 is threaded to a screw 452, which projects from the valve shaft 431 and extends through the center of the diaphragm 403. A sealing member 455 is held between the flange 433 and the first spring support member 450. The sealing member 455 seals between the flange 433 and the first spring support member 450.

The first spring support member 450 includes a flange-like spring receiver 453, which extends in the radial direction. A column 456 is formed at the center of the spring receiver 453 and extends in the axial direction. A column 458 is formed at the center of the second spring support member 451 and extends toward the diaphragm 403. A flange-like spring receiver 459, which extends in the radial direction, is formed at the proximal end of the second spring support member 451. A double coil spring 460 is located between the first and second spring support members 450, 451.

An adjustment screw 470 is screwed to the outer end surface of the cover 402. The distal end of the adjustment screw 470 abuts against a recess 471 formed in the end surface of the second spring support member 451. The position of the adjustment screw 470 with respect to the cover 402 is adjusted to control the spring load of the double coil spring 460. The spring load of the double coil spring 460 is set greater than that of the coil spring 430 for the valve body 425. A through hole 472 is formed in the adjustment screw 470 to expose the spring chamber 440 to the atmosphere. The pressure reducing chamber 404 is connected to the outside via a passage 475 formed in the mounting member 101 and a pipe (not shown).

In the pressure reducing valve 400 formed as described above, the pressure in the pressure reducing chamber 404 is equal to the atmospheric pressure when high-pressure hydrogen gas is not flowing into the valve chamber 408. At this time, the force of the double coil spring 460 moves the diaphragm 403 toward the inside of the pressure reducing chamber 404 until the flange 433 of the valve shaft 431 abuts against the flange 434 of the valve shaft guide member 417. In this state, the valve body 425 is in the open state where the valve body 425 is separate from the seat portion 424. See FIGS. 6(c) and 6(d).

In this state, if high-pressure hydrogen gas flows into the valve chamber 408 via the passage 410, hydrogen gas flows into the pressure reducing chamber 404 through the gap between the valve body 425 that is in the open state and the valve seat retaining member 407, the gap between the valve body 425 and the seat portion 424, the valve hole 423, the communication hole 420, the gap between the inner circumferential surface of the guide hole 418 and the valve shaft 431, and the gap between the flanges 434, 433.

When the pressure in the pressure reducing chamber 404 increases, the diaphragm 403 moves toward the inside of the spring chamber 440 against the force of the double coil spring 460. When the valve body 425 contacts the seat portion 424 by the pressure increase in the pressure reducing chamber 404 and the urging force of the coil spring 430, the pressure reducing valve 400 is closed. When the pressure reducing valve 400 is closed, the high-pressure hydrogen gas in the pressure reducing chamber 404 is delivered outside through the passage 475. When the pressure in the pressure reducing chamber 404 is reduced to a pressure that is lower than a predetermined pressure by the delivery of hydrogen gas to the outside, the double coil spring 460 restores the valve body 425 to the open state where the valve body 425 is separate from the seat portion 424.

The preferred embodiment formed as described above has the following characteristics.

(1) In the electromagnetic valve 100 according to the preferred embodiment, the pilot valve 122 is formed of SUS316L stainless steel and the pilot valve seat 134 is formed of flexible polyimide resin. The main valve body 130 is formed of SUS315L stainless steel and the main valve seat 162 is formed of polyimide resin.

As a result, if the pilot valve 122 contacts the pilot valve seat 134 in hydrogen gas having a high pressure of 70 MPa, the pilot valve seat 134 made of polyimide resin elastically deforms. Therefore, a gap is not formed between the pilot valve 122 and the pilot valve seat 134 thereby maintaining the sealing effectiveness. When the main valve body 130 contacts the main valve seat 162 in hydrogen gas having a high pressure of 70 MPa, the main valve seat 162 made of polyimide resin elastically deforms in the same manner. Therefore, the sealing effectiveness is maintained. Since the surface roughness of the pilot valve seat 134, the main valve seat 162, the pilot valve 122, and the main valve body 130 is less than or equal to 1 μm Ra, the pilot valve seat 134 and the main valve seat 162 closely contact the pilot valve 122 and the main valve body 130, respectively, in the closed state. Furthermore, since dimensional tolerance of the pilot valve seat 134, the main valve seat 162, the pilot valve 122, and the main valve body 130 is set to less than or equal to 1 μm and the components are machined with high accuracy, the sealing effectiveness is improved. If the surface roughness exceeds 1 μm Ra, the sealing is not maintained during valve closing in the high pressure of 70 MPa.

(2) In the preferred embodiment, the valve body 425 of the pressure reducing valve 400 is formed of SUS316L stainless steel and the valve seat 421 including the seat portion 424 is formed of polyimide resin. As a result, even if the valve body 425 contacts the seat portion 424 in hydrogen gas having a high pressure of 70 MPa, the seat portion 424 made of polyimide resin elastically deforms. Therefore, sealing effectiveness is maintained.

Since the surface roughness of the valve seat 421 and the valve body 425 is set to less than or equal to 1 μm Ra, the valve seat 421 closely contacts the valve body 425 during valve closing. Furthermore, since dimensional tolerance of the valve seat 421 and the valve body 425 is set to less than or equal to 1 μm and the components are machined with high accuracy, the sealing effectiveness is improved. If the surface roughness exceeds 1 μm Ra, the sealing is not maintained during valve closing in a high pressure of 70 MPa.

(3) In the electromagnetic valve 100 of the preferred embodiment, the pilot valve seat 134 is formed at a portion of the main valve body 130 that contacts the pilot valve 122. The pilot valve seat 134 is formed of flexible synthetic resin, which is polyimide resin. The pilot valve 122 is formed of SUS316L stainless steel. In this manner, the sealing effectiveness is improved by only applying necessary material to contact portions.

(4) In the pressure reducing valve 400 of the preferred embodiment, a coating having a low friction coefficient made of TiN is formed on the surface of the valve body 425 through physical vapor deposition (PVD) coating. As a result, the valve body 425 smoothly slides along the slide bore 415 of the valve seat retaining member 407.

Assume that a sealing member such as an O-ring or a slide sealing is located on the outer circumferential surface of the valve body 425 under a high pressure of 70 MPa. In this case, the sliding resistance of the sealing member (valve body 425) with respect to the slide bore 415 is very large. This hinders the movement of the valve body 425. This causes great hysteresis in the variation of the secondary pressure (pressure in the pressure reducing chamber 404). In contrast, the hysteresis of the secondary pressure is reduced in the preferred embodiment.

As a result, when the decompression device 10 is applied to an automobile that uses a fuel cell, the valve body 425 is prevented from causing seizure and being worn even when the valve body 425 is used for a long period.

The pressure reducing valve 400 of the preferred embodiment has the sealless portion M between the valve seat retaining member 407 (valve member accommodating member), which accommodates the valve body 425 (valve member), and the valve body 425. As a result, the above mentioned advantages are not hindered since there is no sealing member.

(5) In the preferred embodiment, the electromagnetic valve 100 includes the pilot valve 122 and the main valve body 130 as the valve member, and the pilot valve seat 134 and the main valve seat 162 as the valve seat. The pilot valve 122 switches between the open state, where the pilot valve 122 separates from the pilot valve seat 134, and the closed state, where the pilot valve 122 contacts the pilot valve seat 134, in accordance with the excitation and de-excitation of the solenoid coil 110 (solenoid).

Furthermore, the preferred embodiment employs a semi-pilot type electromagnetic valve in which the main valve body 130 shifts from the closed state to the open state when the pilot valve 122 opens. The electromagnetic valve 100 formed as described above provides the operations and advantages of (1) to (4).

(6) The electromagnetic valve 100 of the preferred embodiment supports the pilot valve 122 and the main valve body 130 with respect to the plunger 112 such that the pilot valve 122 and the main valve body 130 has play in the operational direction of the plunger 112.

Therefore, in the preferred embodiment, the floating structure of the main valve body 130 and the pilot valve 122 permit the main valve body 130 and the pilot valve 122 to reliably fit the shape of the main valve seat 162 and the pilot valve seat 134. Accordingly, the main valve body 130 and the pilot valve 122 are reliably sealed when closed.

In the preferred embodiment, the pilot bore 133 and the bore 135, which have very small diameters, need to be sealed to operate the pilot valve 122 under a high pressure of 70 MPa by the low powered solenoid coil 110. The pilot valve 122 and the main valve body 130 are designed to have the floating structure to seal the pressure receiving area around such small bores. This improves the close contact between the pilot valve 122 and the pilot valve seat 134 and between the main valve body 130 and the main valve seat 162.

(7) In the electromagnetic valve 100 of the preferred embodiment, the tapered surface 124 is formed at the distal end of the pilot valve 122 such that the diameter of the distal end decreases toward the pilot valve seat 134. The inner diameter of the pilot valve seat 134 increases toward the pilot valve 122 corresponding to the shape of the tapered surface 124 of the pilot valve 122. As a result, when the pilot valve 122 is closed, the contact area between the tapered surface 124 and the pilot valve seat 134 increases as the tapered surface 124 approaches the pilot valve seat 134.

(8) In the pressure reducing valve 400 of the preferred embodiment, the pressure reducing chamber 404 is formed between the mounting member 101 (valve body) and the diaphragm 403. The valve seat 421 is formed at the opening of the valve hole 423, which is connected to the pressure reducing chamber 404. The valve body 425 is arranged to selectively contact the valve seat 421. The valve body 425 is coaxially secured to the valve shaft 431, which is coupled to the diaphragm 403. As a result, the pressure reducing valve 400 formed as described above provides the operations and advantages of (1) to (4).

(9) In the decompression device 10 of the preferred embodiment, the port P1 at the valve-inlet of the electromagnetic valve 100 is connected to the high-pressure hydrogen tank T (high-pressure hydrogen gas container). The port P2 at the valve-outlet of the electromagnetic valve 100 is connected to the port P3 at the valve-inlet of the pressure reducing valve 400. The decompression device 10 formed as described above provides the operations and advantages of (1) to (4).

It should be apparent to those skilled in the art that the present invention may be embodied in many other specific forms without departing from the spirit or scope of the invention. Particularly, it should be understood that the invention may be embodied in the following forms.

(1) In the preferred embodiment, the pilot valve 122 of the electromagnetic valve 100 is formed of SUS316L stainless steel and the pilot valve seat 134 is formed of polyimide resin. Contrarily, the pilot valve 122 may be formed of a polyimide resin and the pilot valve seat 134 may be formed of SUS316L stainless steel. In this case, the dimensional tolerance of the pilot valve 122 and the pilot valve seat 134 is preferably less than or equal to 1 μm and the surface roughness is preferably less than or equal to 1 μm Ra.

Furthermore, the main valve body 130 of the electromagnetic valve 100 may be formed of polyimide resin and the main valve seat 162 may be formed of SUS316L stainless steel. In this case, the dimensional tolerance of the main valve body 130 and the main valve seat 162 is preferably less than or equal to 1 μm and the surface roughness is preferably less than or equal to 1 μm Ra.

(2) In the preferred embodiment, the valve body 425 of the pressure reducing valve 400 is formed of SUS316L stainless steel and the valve seat 421 is formed of a polyimide resin. Contrarily, the valve body 425 may be formed of polyimide resin and the valve seat 421 may be formed of SUS316L stainless steel. In this case, the dimensional tolerance of the valve body 425 and the valve seat 421 is preferably less than or equal to 1 μm and the surface roughness is preferably less than or equal to 1 μm Ra.

(3) Polyether ether ketone (PEEK) resin may be used as flexible synthetic resin instead of polyimide resin. The PEEK resin consists of crystalline aromatic polyether and has superior fatigue resistance relative to the polyimide resin.

Soft metal may be used instead of flexible synthetic resin. Examples of soft metal include copper alloys such as brass and bronze. A copper alloy such as brass and bronze is softer than the SUS316L stainless steel and is able to elastically deform.

(4) When using SUS316L stainless steel and polyimide resin, the entire valve member or the entire valve seat need not be formed with these materials. For example, only portions of the valve member and the valve seat that contact each other may be formed with these materials.

(5) Polyfluoroethylene resins may be used as flexible resin instead of polyimide resin. As for the polyfluoroethylene resins, for example, Teflon (registered trademark) may be used.

(6) In the pressure reducing valve 400 of the preferred embodiment, a coating having a low friction coefficient made of TiN is formed on the surface of the valve body 425. However, the coating need not be formed of TiN. A coating having a low friction coefficient made of CrN, Au, or $MoS_2$ may be formed through the surface treatment of the PVD coating. An amorphous hard carbon coating, which is a diamond-like carbon (DLC) coating, may be formed as the low-friction coefficient coating. Also, a baking treatment may be performed on the valve body 425 as the surface treatment to apply fluorocarbon resin coating. Then, a coating having a low friction coefficient may be formed with polytetrafluoroethylene (PTFE).

Furthermore, an Au coating, Ni—P plating, or Ni—B plating may be formed through plating treatment as a coating having a low friction coefficient.

(7) The electromagnetic valve 100 of the preferred embodiment supports the pilot valve 122 and the main valve body 130 with respect to the plunger 112 such that the pilot valve 122 and the main valve body 130 has play in the operational direction of the plunger 112. Instead, one of the pilot valve 122 and the main valve body 130 may be supported with respect to the plunger 112 to have play in the operational direction of the plunger 112.

In this case also, the close contact between the valve member and the valve seat, which have the floating structure, is improved.

Figure 7:
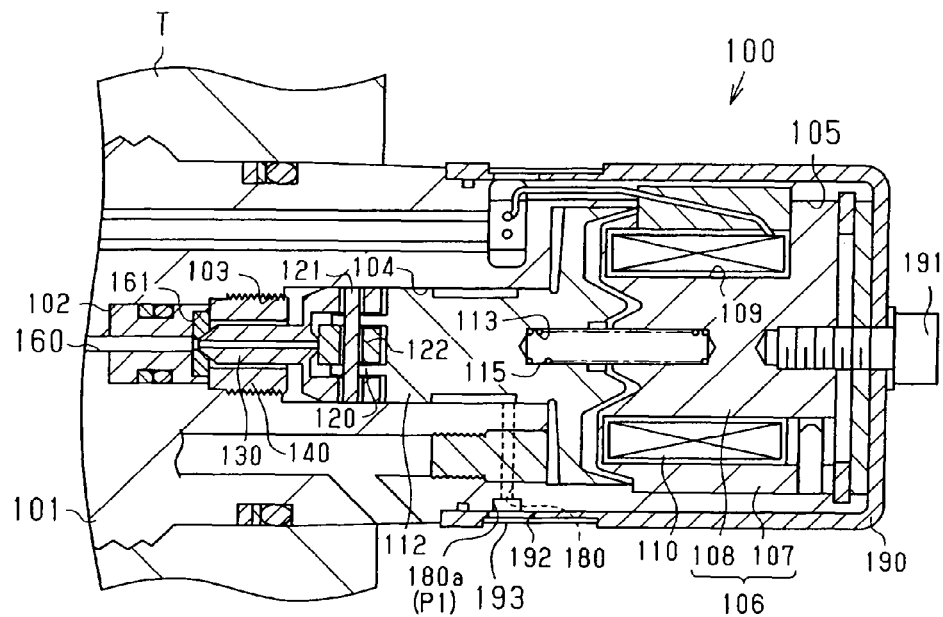
FIG. 7 is a cross-sectional view illustrating an electromagnetic valve according to a modified embodiment.
Figure 8:
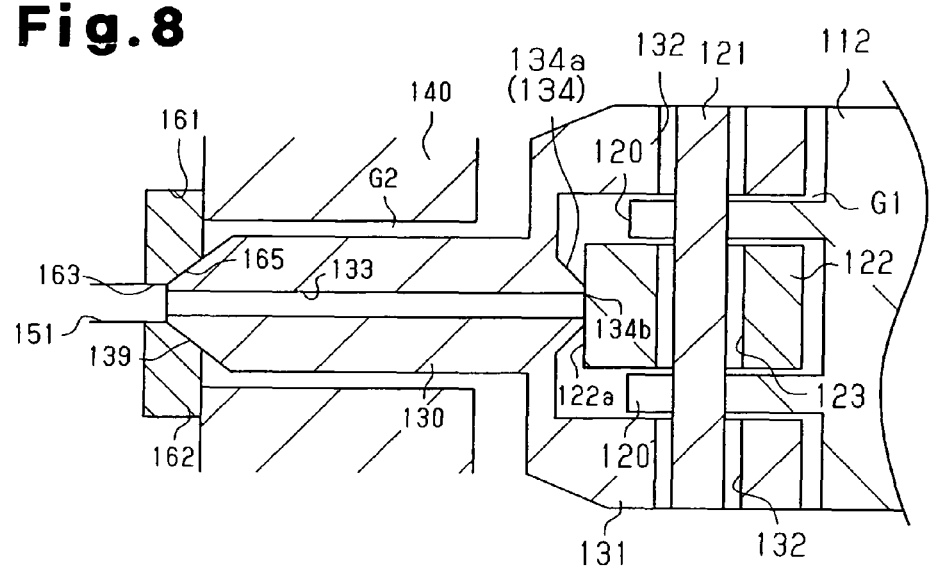
FIG. 8 is an enlarged cross-sectional view illustrating a main valve body and a pilot valve of the electromagnetic valve shown in FIG. 7.

(8) In the electromagnetic valve 100 of the preferred embodiment, the tapered surface 124 is formed on the pilot valve 122. The pilot valve seat 134 is formed to selectively contact the tapered surface 124 of the pilot valve 122. Instead of this structure, the structure as shown in FIGS. 7 and 8 may be employed. Only the parts different from the preferred embodiment are explained. Like members are given like numbers and detailed explanations are omitted.

In the modified embodiment, the tapered surface 124 of the pilot valve 122 is omitted. Instead, a flat surface 122*a* is formed at the end of the pilot valve 122 facing the pilot valve seat 134. The pilot valve 122 is formed of polyimide resin. An example of polyimide resin includes VESPEL (registered trademark of DuPont). The pilot valve seat 134 includes a projection 134*a*, the outer diameter of which decreases toward the pilot valve 122. The end surface of the projection 134*a* forms a flat surface 134*b*, which is arranged to selectively contact the flat surface 122*a* of the pilot valve 122. The pilot valve seat 134 is formed integrally with the main valve body 130 using SUS316L stainless steel. Other structures are the same as those of the embodiment shown in FIG. 4. In this case also, the operations and advantages provided are the same as those of the embodiment shown in FIG. 4.

Furthermore, according to the structure of the modified embodiment, the sealing effectiveness is maintained while the pressure of the hydrogen gas is in the range of zero to 70 MPa.

Therefore, the present examples and embodiments are to be considered as illustrative and not restrictive and the invention is not to be limited to the details given herein, but may be modified within the scope and equivalence of the appended claims.

What is claimed is:

1. A high pressure valve for hydrogen gas, the high pressure valve comprising:
    a solenoid;
    a main valve seat and a pilot valve seat;
    a main valve body, which is switchable between a closed state, where the main valve body contacts the main valve seat, and an open state, where the main valve body is separated from the main valve seat;
    a pilot valve body, which is switchable between a closed state, where the pilot valve body contacts the pilot valve seat, and an open state, where the pilot valve body is separated from the pilot valve seat, and
    wherein the pilot valve body is switched between the open state and the closed state in accordance with excitation and de-excitation of the solenoid, and the main valve body switches from the closed state to the open state when the pilot valve body is switched from the closed state to the open state, and
    a plunger, which moves in an operational direction in accordance with excitation and de-excitation of the solenoid, wherein the plunger is coupled to the pilot valve body and the main valve body, the main valve body includes a pilot bore and the pilot valve seat, the pilot valve seat includes a pilot valve hole, which is connected to the pilot bore, wherein the pilot valve body includes a distal end having an outer diameter, and wherein the outer diameter of the pilot valve body decreases toward the distal end, and the pilot valve hole of the pilot valve seat includes an inner diameter that corresponds with the outer diameter of the distal end of the pilot valve body,
    wherein the pilot valve body and the main valve body are supported with respect to the plunger to have play in the operational direction of the plunger, both when moving the plunger to switch the pilot valve body and the main valve body to the open state and when moving the plunger to switch the pilot valve body and the main valve body to the closed state, wherein the pilot valve body is arranged and constructed such that at all times when the pilot valve body contacts the pilot valve seat, the pilot valve hole and the pilot bore are closed,
    further comprising a support pin mounted to the plunger without play, and extending at least partly through a wall of said main valve body, transverse to the operational direction of the plunger, wherein each of the pilot valve body and the main valve body is supported by the support pin to have play in the operational direction of the plunger.

2. A pressure reducing valve connected to a tank containing hydrogen gas via the high pressure valve according to claim 1, the pressure reducing valve being used to reduce the pressure in the tank, the pressure reducing valve comprising:
    a valve body and a diaphragm, wherein the valve body and the diaphragm define a pressure reducing chamber, the pressure reducing chamber including a valve hole provided with a valve seat; and a valve member located to selectively contact the valve seat, wherein the valve member is connected to the diaphragm, and the diaphragm is displaced in accordance with the pressure in the pressure reducing chamber, and the valve member selectively opens and closes the valve hole in accordance with the displacement of the diaphragm.

3. The pressure reducing valve according to claim 2, further comprising:

an accommodating member, which includes the valve hole and accommodates the valve member therein, wherein a sealless portion is set between the accommodating member and the valve member.

4. The pressure reducing valve according to claim 1, wherein the play of the main valve body with respect to the plunger is greater than the play of the pilot valve body with respect to the plunger.

* * * * *

UNITED STATES PATENT AND TRADEMARK OFFICE
CERTIFICATE OF CORRECTION

PATENT NO. : 7,730,905 B2
APPLICATION NO. : 12/018536
DATED : June 8, 2010
INVENTOR(S) : Suzuki et al.

It is certified that error appears in the above-identified patent and that said Letters Patent is hereby corrected as shown below:

On the title page, Item (73), the Assignees' information is incorrect. Item (73) should read:

(73) Assignees: Jtekt Corporation, Osaka-shi (JP);
Toyooki Kogyo Co., Ltd., Okazaki-shi (JP)

Signed and Sealed this

Seventeenth Day of August, 2010

David J. Kappos
*Director of the United States Patent and Trademark Office*